United States Patent Office 2,763,536

Patented Sept. 18, 1956

2,763,536

ETCHING

John A. Easley and Harry E. Swayze, Midland, Mich., assignors to The Dow Chemical Company, Midland, Mich., a corporation of Delaware No Drawing. Application May 20, 1953, Serial No. 356,294

18 Claims. (Cl. 41—42)

The invention relates to a method of etching metal. It more particularly concerns an improved method of producing a relief in the surface of an object of a metal easily soluble in acid, as in making a printing plate by etching with an acid solution.

In the conventional method of making a metal printing surface in relief, as in making a photoengraving of an acid-soluble metal, such as magnesium, zinc, and their alloys, a light-sensitive coating or "enamel" is applied to the metal surface which is usually flat or cylindrical. The coated surface is exposed to light through a negative having an image therein so as to produce a corresponding image in the coating. The exposed coated surface is "developed" forming an acid resistant coating in the form of the image produced by the exposure. The acid resistant coating, which is referred to as a resist, is usually further hardened as by a hardening treatment which increases its resistance to the etching acid. The surface of the metal bearing the so-prepared resist is then subjected to etching by an acid.

The etching is usually carried out with nitric acid suitably diluted with water, the acid solution being usually splashed or otherwise impinged against the object. The acid solution attacks the bare portions of the metal, that is, the proportions of the metal object denuded of the light sensitive material in the developing operation. The rest of the metal surface is protected by the resist from direct attack by the acid which does not penetrate the resist. As the etching proceeds, metal from the bare portions of the object dissolves away leaving the image in vertical relief. While the relief is being thus formed, the metal of the relief is attacked by the acid in a lateral direction and the resist will become undesirably undercut around its edges if the etching operation is too long continued without protecting the sides of the relief from lateral attack. Before a significant amount of the metal forming the relief is dissolved away by lateral attack, it is conventional practice to rinse off the etching solution, dry the rinsed object, and then treat the dried object so as to protect the metal in relief from lateral attack by the acid before proceeding with a further etching operation. One method of providing this protection is to powder the object in each of four directions, N. S. E. and W., with an acid-resisting powder material called "etching powder" so as to coat with the powder all sides of the portions of the metal in relief. After each powdering in each direction, the powder is "burned-in," that is, the powdered etched object is heated to fuse and fix the acid-resisting material in place as an acid resistant deposit. The object thus protected by powdering, or otherwise, is then given a second etch. This second etching operation, performed like the first, increases the depth of the prior etch without attack on the metal already in relief, the sides of which are protected from the acid by the burned-in etching powder.

The second etching operation, like the first, is stopped before an excessive amount of attack is produced on the sides of the portion of the relief newly formed by the second etch below the protected portion of the relief formed in the first etch. The so-etched object is again rinsed, dried, and given another protective treatment as by powdering so as to form an acid-resisting deposit on all sides of the newly formed portion of the relief. The object is then ready for a third etching operation which is carried out in a manner similar to the preceding ones, followed by rinsing, drying, powdering, and burning-in if still another etch is to be done. The object is thus alternately subjected to etching, protecting of the relief, and re-etching so as to accentuate the relief while restraining attack by the acid on the image-supporting metal in relief, until a sufficient depth of etch is produced in the surface of the object, not coated with resist, to meet printing requirements. The number of etches made by the acid or "bites," as these etches are called in the trade, is usually three, four or five depending upon the character of the image and the depth of etch required. The foregoing steps are well-known in the art and are practiced in various ways best adapted to the work in hand.

Although the acid etches away the bare metal rapidly, the time taken for the entire operation of completing the preparation of a relief, as for a printing surface for example, when several bites are required is inordinately large. This is due mainly to the numerous time-consuming steps of rinsing, drying, and protecting the relief which are required between each bite of the etcher to prevent undercutting the image while obtaining a sufficient depth of etch for the purpose in hand and are more time-consuming than the etching operation itself.

In our copending application Serial No. 210,616, filed February 12, 1951, now U. S. Patent No. 2,640,765, we have disclosed etching bath compositions which produce a deep etch while the tendency of the acid to attack the relief laterally is controlled without powdering and burning-in so that the need for making repeated "bites" and performing the attendant time-consuming steps of rinsing, drying, powdering, and burning-in between bites is eliminated. The etching baths disclosed comprise essentially diluted nitric acid, a wetting agent of an ester of sulfosuccinic acid and an aliphatic alcohol, and a water-immiscible organic material unreactive with the aqueous nitric acid solution, such as gasoline, benzine, kerosene, coal oil, hydrocarbon lubricating oils, turpentine, perchloroethylene, and the diethyl benzenes. The etching bath components are maintained in a mixed condition as by the agitation employed during etching when splashing or otherwise impinging the bath against the work to be etched.

In etching printing plates of a magnesium-base alloy, that is, alloys containing at least 80 per cent of magnesium, bearing a resist of printed matter such as newspaper copy, with one of the etching bath formulations within the purview of the aforesaid patent application, viz. an etching bath made up of dilute nitric acid, a wetting agent of a dioctyl sulfosuccinate, and any of the diethyl benzenes, an unusual etching action has been observed. The unusual observation is that the etching action ceases on the small bare areas of the plate encircled by a line of resist, as in the letters a, A, b, B, d, D, e, g, o, p, P, Q, which may be referred to as closed letters, and in the narrow spaces between adjacent portions of the resist, after only a moderate depth of etch is produced in spite of continued exposure of the plate to the etching bath which continues to etch the larger areas of the bare portions of the plate, that is the areas around the letters, leaving them in relief. The depth of the etch produced in the areas encircled by a line of resist before the etching action comes to a stop appears to be more or less directly proportional to the size of the encircled areas. That is to say, the smaller the bare encircled area, subjected to the etching action of the bath, the sooner the etching action ceases. In some instances, the cessation of the etching action of the bath within the encircled areas results in an insufficient depth of etch being produced in these areas even though within the same time of exposure to the bath an adequate etching depth is readily obtained in the adjacent larger areas, namely those beyond the immediate vicinity of the letters, where the etching action does not become prematurely arrested or retarded.

Further research has resulted in the discovery that by including in the etching bath a suitable thickening agent, such as a water-soluble natural gum, e. g. gum arabic, karaya and the like, methyl cellulose, dextrin or gelatin, the etching action of the bath is thereby caused to continue in areas in which the etching action would otherwise cease. As a result, a wider range of letter sizes can be clearly etched in relief to a sufficient depth within and adjacent to resist encircled areas for printing purposes.

The invention then consists of the improved etching composition and method of etching herein fully disclosed and particularly pointed out in the claims.

In accordance with the invention, the etching bath is formulated by mixing together the following five ingredients in the following proportions by weight:

(1) *Nitric acid.*—The bath contains from 2 to 14 per cent by weight of nitric acid reckoned as 100 per cent $HNO_3$. Inasmuch as the bath is to contain a large proportion of water as one of the ingredients, water may be introduced into the bath at least in part as a diluent of the nitric acid so that a suitably dilute aqueous nitric acid solution may be used rather than concentrated in making up the bath, taking into account the water content as indicated in Item 5 below. Preferred proportions of nitric acid in the bath are from 5 to 11 per cent of $NHO_3$, a generally suitable proportion being about 10 per cent.

(2) *A dioctyl sulfosuccinate.*—There may be used, for example, sodium dioctyl sulfosuccinate,

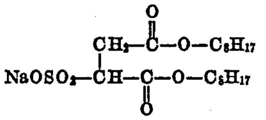

or the dioctyl sulfosuccinic acid. The lower limit of the effective concentration in per cent of the weight of the bath depends upon the concentration of the nitric acid and is at least 0.005 times the figure for the percentage of $HNO_3$ in the bath, i. e. the lower limit in per cent ranges from $0.005\times2$ to $0.005\times14$ as the nitric acid concentration ranges from 2 to 14 per cent. The maximum effective concentration in per cent by weight is 0.10 times the percentage of $HNO_3$. Generally, desirable concentrations range between the lower and upper limits, as for example, a preferred minimum concentration in per cent is 0.01 times the percentage figure for the $HNO_3$ in the bath while the preferred maximum concentration in per cent is 0.04 per cent of $HNO_3$.

(3) *A diethyl benzene.*—The amount may range from 2 to 15 per cent of the weight of the bath but the ratio of the per cent of diethyl benzene to the per cent of $HNO_3$ preferably should not exceed 3.5. Any one of the three isomers ortho-, meta-, and para-diethyl benzene or any mixture of two or more of them may be used. A generally preferred range of proportions is from 4 to 9 per cent by weight.

(4) *A thickening agent.*—The amount used is very small, being far less than that producing a noticeable increase in viscosity of the etching bath, and hence the thickening agent is not used in the bath for its thickening effect. Yet, in the small concentration called for by the invention, a strikingly noticeable effect on the etching characteristics is produced so that the proper concentration may be ascertained by trial. If too small an amount of thickening agent is used, there will result an insufficient depth of etch in the small bare areas, such as inside small closed letters and between adjacent letters in the same word. Too large an amount is evidenced by a severe undercutting of the image. Amounts between these extremes are used.

In the case of the water-soluble gums, e. g. gum arabic, the amount to use appears to depend upon both the concentration of $HNO_3$ and that of the wetting agent. On this basis, in terms of per cent of the weight of the bath, amounts in the order of 1/10 to 1 of the ratio of the per cent of the wetting agent to the per cent of $HNO_3$ in the bath may be used. A preferred proportion is from 0.125 to 0.5 of the ratio of the per cent of the wetting agent to per cent of $HNO_3$. For example, if the per cent of $HNO_3$ in the bath is 10 and that of the wetting agent is 0.05, the per cent of gum to use in the bath would be from 1/10 of 0.05/10 to 0.05/10 or from 0.0005 to 0.005 per cent.

In the case of methyl cellulose, the amount to use also appears to depend upon the concentration of both the wetting agent and that of the $HNO_3$ and is expressible by the formula: per cent methyl cellulose=0.0007 to 0.01 of the ratio: per cent wetting agent/per cent $HNO_3$. The preferred limits for methyl cellulose are 0.00125 to 0.0025 of the ratio: per cent wetting agent/per cent $HNO_3$. The grade of the methyl cellulose does not appear to be critical. For example, methyl cellulose producing in 2 per cent aqueous solution or dispersion in water, viscosities of 25 to 4000 centipoises at 20° C. may be used.

In the case of gelatin, the amount to use also appears to depend upon the concentration of both the wetting agent and the nitric acid in the bath and is expressible by the formula: per cent gelatin=0.0020 to 0.015 of the ratio: per cent wetting agent/per cent $HNO_3$. The preferred limits for gelatin are from 0.0035 to 0.007 of the ratio of the per cent of wetting agent to the per cent of the $HNO_3$.

The dextrin requirements in per cent of the bath weight also appear to depend upon the ratio of the per cent of the wetting agent to the per cent of $HNO_3$ and numerically ranges from 3 to 7 times this ratio. A preferred proportion is from 4 to 6 times the ratio of the per cent of wetting agent to the per cent of $HNO_3$. In any event, desirable amounts of any of the thickening agents to use may be determined by trial within the limits given by the foregoing rules.

(5) The balance of the bath is water.

The following examples are illustrative of the etching bath of the invention, each example having as a blank for comparison the etching action of a similar bath without the addition of the thickening agent.

EXAMPLE 1

*Blank: Etching bath No. 1 without thickening agent*

The following materials are mixed together in an etching tank provided with splash paddles for agitating and splashing the bath against the work to be etched.

(1) Place about 40 liters of water at 85° F. in the etching tank.

(2) Add 6.45 liters of technical grade 42° Bé nitric acid.

(3) Add 744 grams of a 25 per cent water solution of sodium dioctyl sulfosuccinate.

(4) Add 4.96 liters of commercial diethyl benzene (comprises 60 per cent meta, 30 per cent para, and 10 per cent ortho-diethyl benzene).

(5) Add sufficient water at 85° to 90° F. to make the volume of the bath 62 liters.

The resulting bath has the following composition by weight:

| | Per cent |
|---|---|
| Sodium dioctyl sulfosuccinate | 0.29 |
| $HNO_3$ | 9.6 |
| Diethyl benzene | 6.8 |
| Water | Balance |

The bath is agitated a few minutes and etching is then begun. For the etching operation, a photoprinted specimen 0.064 inch x 5 inch x 9 inches is used of a magnesium-base alloy plate having a nominal composition of 3 per cent aluminum, 1 per cent zinc, 0.15 per cent manganese, the balance being magnesium. The resist is a polyvinyl resin base on one face of the specimen and comprises printed matter in 6 and 8 point type. Before etching, the resist face is descummed by swabbing it for 30 seconds with cotton soaked in an aqueous solution consisting of 4 ounces of potassium permanganate and 4 ounces of sodium hydroxide per gallon. The descummed specimen is rinsed and then subjected to the etching action of the above etching bath. The specimen, resist face down, is rotated and moved back and forth in a horizontal plane over the bath while the bath liquid is splashed upwardly against the specimen with rotating paddles dipping into the bath as they rotate. The splashing is continued for 5.5 minutes at 90 F°. The resulting etched specimen is rinsed and dried in a current of warm air. Examination of the etched specimen reveals that the depth of etch beyond the letters is about 0.017 inch in the largest open areas while the maximum depth of etch inside the 6 point letters is about 0.003 inch and the depth of etch between adjacent letters in a word is 0.003 to 0.004 inch.

*Etching bath No. 1 containing dextrin*

To another batch of 62 liters of the composition of blank No. 1 is added 93 grams of dextrin in a 2 per cent aqueous solution, thereby producing a concentration of 0.145 per cent, the dextrin being added along with the diethyl benzene. A duplicate of the photoprinted specimen as the blank is descummed by swabbing with the same descumming solution as used on the blank. The descummed specimen is etched for 5 minutes in the same manner as that of the blank at 90° F. The resulting specimen is rinsed and dried. The maximum depth of the etch in the large open areas is 0.019 inch and 0.004 to 0.009 inch inside 6 point type letters and 0.005 to 0.007 inch between adjacent letters.

EXAMPLE 2

*Etching bath No. 2 containing gum arabic*

To another batch of 62 liters of the composition of the blank No. 1 above is added 186 milliliters of a 2 per cent water solution of gum arabic, the addition being made along with the diethyl benzene. The amount of gum arabic thus added is 3.72 grams and produces in the bath a calculated gum concentration of 0.0058 per cent, the rest of the bath has the same composition as the blank. A duplicate of the photoprinted specimen used as the blank is descummed by swabbing the resist bearing surface with a 10 per cent aqueous solution of nitric acid, thereby rendering the bare portions of the metal bright and removing about 0.0005 inch of metal from the bare portions. The swabbed specimen is rinsed in water and then subjected for 5 minutes to the etching action at 90° F. of the bath containing the gum arabic in the same manner as the blank. The resulting etched specimen is rinsed and dried. The depth of the etch so-obtained inside the letters and between adjacent letters is from 0.004 to 0.009 inch.

EXAMPLE 3

*Blank: Etching bath No. 3 without thickening agent*

In the apparatus of Example 1 mix together, the following materials:

(1) Place about 40 liters of water at 85° F. in the etching tank.

(2) Add 6.4 liters of 1.42 sp. gr. nitric acid.

(3) Add 3.2 liters of diethyl benzene.

(4) Add 96 grams of sodium dioctyl sulfosuccinate dissolved in about 2 liters of water.

(5) Add sufficient water at 85°–90° F. to make the volume of the bath 64 liters.

The bath is agitated a few minutes and etching is then begun using a photoprinted specimen similar to that of Example No. 1. Before etching, the specimen is descummed by swabbing the resist side with a 10 per cent aqueous nitric acid solution until 0.0005 inch of the exposed metal is removed leaving it bright. The etching bath is at 85°±5° F. and the specimen is etched for 5.5 minutes using the same procedure as in blank No. 1. The etched specimen is rinsed and dried. The maximum depth of the etch so-obtained inside the 6 point type letters is 0.003 inch and about the same depth of etch is obtained between adjacent letters in the same word.

*Etching bath No. 3 containing gum arabic*

To another batch of 64 liters of the same composition as the blank No. 3 above is added 96 milliliters of a 2 per cent aqueous solution of gum arabic along with the diethyl benzene. The amount of gum thus added is 1.92 grams and produces a calculated concentration in the bath of 0.003 per cent. A similar photoprinted specimen to that used in blank No. 2 after swabbing is etched in the bath at 88°±5° F. in the same manner as blank No. 3 for 5.5 minutes then rinsed and dried. The depth of the etch so-obtained inside the 6 point type letters is 0.004 to 0.008 inch and 0.004 inch or more between adjacent letters in the same word.

EXAMPLE 4

*Etching bath No. 4 containing gum arabic*

To another batch of 64 liters of the same composition as blank No. 3 is added 208 milliliters of a 2 per cent aqueous solution of gum arabic. The amount of gum thus added is 4.16 grams and produces a calculated gum concentration in the bath of 0.0052 per cent. A similar photoprinted specimen to that used with blank No. 2, after swabbing, is etched in the bath in the same manner as blank No. 2 for 5.5 minutes at 85°±5° F. The resulting etched specimen is rinsed and dried. The depth of etch so-obtained inside the 6 point letters is 0.004 to 0.012 inch and 0.004 inch or more between adjacent letters in the same word.

EXAMPLE 5

*Blank: Etching bath No. 5 without thickening agent*

In the apparatus of Example No. 1 mix together the following ingredients:

(1) Place in the etching tank about 40 liters of water.

(2) Add 6.48 liters of 42° Bé. nitric acid.

(3) Add 186 grams of sodium dioctyl sulfosuccinate as a 2 per cent aqueous solution.

(4) Add 4.96 liters of diethyl benzene.

(5) Add sufficient water to make the volume of the bath 62 liters.

The bath is agitated for a few minutes and then etching is begun using a photoprinted specimen similar to that used in Example 1. The resist face of the specimen is descummed before etching by swabbing for 30 seconds with an aqueous solution containing 4 ounces of potassium permanganate and 4 ounces of sodium hydroxide per gallon. The specimen is etched for 5 minutes at 90° F. in the same manner as blank No. 1 and then rinsed and dried. The depth of etch so-obtained in the open areas beyond the letters is about 0.017 inch with a maximum depth of etch inside and between adjacent letters of 0.003 inch.

*Etching bath No. 5 containing gelatin*

To another batch of 62 liters of the etching bath of the composition of the blank No. 5 is added 93 milliliters of a 0.1 per cent solution of gelatin in water. The amount of gelatin thus added produces a calculated gelatin concentration in the bath of $1.45 \times 10^{-4}$ per cent. A similar photoprinted specimen to that used in Example 1 is descummed and then etched for 5 minutes at 90° F. in similar manner to the blank No. 5. The so-etched specimen is rinsed and dried. The resulting depth of etch is 0.0205 inch in the open areas and from 0.004 to 0.01 inch in and adjacent to the 6 point letters.

EXAMPLE 6

*Etching bath No. 6 containing gelatin*

To another batch of 62 liters of the etching bath of the same composition as the blank No. 5 is added 93 milliliters of a 0.05 per cent water solution of gelatin, thereby producing in the bath a calculated gelatin concentration of $7.2 \times 10^{-5}$ per cent. A similar photoprinted specimen to that used in Example 1 is descummed as with the blank, rinsed, and then etched in the same manner as blank No. 4 for 5 minutes in the foregoing bath at 85°±5° F. The resulting etched specimen is rinsed and dried. The minimum depth of etch so-obtained inside letters is 0.004 inch and 0.005 inch between adjacent letters.

EXAMPLE 7

*Blank: Etching bath No. 7 without thickening agent*

The following materials are mixed together in a suitable etching tank:

| | | |
|---|---|---|
| Concentrated nitric acid, sp. gr. 1.42 | liters | 6.4 |
| Sodium dioctyl sulfosuccinate | grams | 96 |
| Commercial diethyl benzene, sp. gr. 0.87 | liters | 3.2 |

Water sufficient to make a volume of 64 liters.

The bath thus obtained has the following composition in weight per cent:

| | Percent |
|---|---|
| $HNO_3$ | 9.5 |
| Sodium dioctyl sulfosuccinate | 0.15 |
| Diethyl benzene | 4.2 |
| Water | Balance |

These ingredients are agitated together for about an hour before use. A photoprinted specimen of a magnesium-base alloy printing plate 4½" x 9" x 0.64" bearing a developed resist of ordinary printed matter on one entire face, the alloy having the nominal composition of 3 per cent Al, 1 per cent Zn, 0.15 per cent Mn, the balance being magnesium, is given a cleaning in a 10 per cent aqueous solution of nitric acid by applying the solution to the resist-coated face of the plate with a brush until about 0.0005 inch thickness of bare metal is etched away leaving a clean surface for relief etching. The so-cleaned plate is then subjected to the etching action of the etching bath of the blank No. 7 by suspending the plate horizontally over the bath with the resist side facing the bath and splashing the solution upwardly against the plate while agitating the bath. The splashing is continued for 5.5 minutes with a bath temperature of from 70° to 75° F. The resulting etched plate is rinsed with water and dried in a current of warm air. Examination of the etched plate reveals that the printed matter is etched in relief, the depth of the relief in the open areas beyond the letters being about 0.018 inch while the depth of the bare metal encircled by the resist of each of the closed letters and between closely adjacent lines of resist ranges from 0.002 inch in the smallest spaces to 0.006 inch in the largest spaces between lines of resist on the plate.

*Etching bath containing methyl cellulose*

To another batch of etching bath of the composition of blank No. 7, there is added 0.0128 gram of methyl cellulose of 4000 C. P. S. grade, thereby giving the bath a methyl cellulose concentration of 0.00002 per cent. A duplicate of the photo-printed specimen used with blank No. 7 is cleaned with 10 per cent nitric acid in the same manner as that of blank No. 7. The so-cleaned plate is subjected to the etching action of the bath containing the methyl cellulose, in the same manner as that of blank No. 7 and for the same length of time at the same temperature and with the same rate of splashing of the bath against the plate. The resulting etched plate is rinsed and dried in a current of warm air. Examination of the so-etched plate reveals that the printed matter is etched in relief, the depth of the relief around the letters being about 0.018 inch while the depth of the bare metal encircled by the resist of each of the closed letters is at least 50 per cent deeper than in the case of blank No. 7 and ranges from 0.003 inch in the smallest closed letters to 0.014 inch in the largest closed letters.

This application is a continuation-in-part of our copending application Serial No. 254,439, filed November 1, 1951, now abandoned.

We claim:

1. An etching bath comprising by weight 2 to 14 per cent of $HNO_3$, a dioctyl sulfosuccinate in a percentage concentration of at least 0.005 of that of the $HNO_3$ in the bath but not in excess of 0.10 of the percentage of the $HNO_3$, from 2 to 15 per cent of diethyl benzene, and a water-dispersible thickening agent selected from the group consisting of the water-soluble gums, gelatin, dextrin, and methyl cellulose, in a percentage by weight of the bath amounting to A times the ratio of the per cent of the dioctyl sulfosuccinate to the per cent of the $HNO_3$ in the bath, A having the following values: between 0.1 and 1 for the water-soluble gums, between 0.002 and 0.015 for gelatin, between 0.0007 and 0.01 for methyl cellulose, and between 3 and 7 for dextrin.

2. An etching bath according to claim 1 in which the thickening agent is gum arabic in a percentage by weight of the bath between about 0.1 and 1 of the ratio of the per cent of the dioctyl sulfosuccinate in the per cent of the $HNO_3$ in the bath.

3. An etching bath according to claim 1 in which the thickening agent is gelatin in a percentage by weight of the bath between 0.0020 and 0.015 of the ratio of the per cent of the dioctyl sulfosuccinate to the per cent of $HNO_3$ in the bath.

4. An etching bath according to claim 1 in which the thickening agent is methyl cellulose in a percentage by weight of the bath between 0.0007 and 0.01 of the ratio of the per cent of the dioctyl sulfosuccinate to the per cent of the $HNO_3$ in the bath.

5. An etching bath according to claim 1 in which the thickening agent is dextrin in a percentage by weight of the bath between 3 and 7 times the ratio of the per cent of the dioctyl sulfosuccinate to the per cent of the $HNO_3$ in the bath.

6. An etching bath according to claim 1 in which the dioctyl sulfosuccinate is sodium dioctyl sulfosuccinate.

7. An etching bath according to claim 2 in which the dioctyl sulfosuccinate is sodium dioctyl sulfosuccinate.

8. An etching bath according to claim 2 in which the dioctyl sulfosuccinate is dioctyl sulfosuccinic acid.

9. An etching bath according to claim 3 in which the dioctyl sulfosuccinate is sodium dioctyl sulfosuccinate.

10. An etching bath according to claim 3 in which the dioctyl sulfosuccinate is dioctyl sulfosuccinic acid.

11. An etching bath according to claim 4 in which the dioctyl sulfosuccinate is sodium dioctyl sulfosuccinate.

12. An etching bath according to claim 4 in which the dioctyl sulfosuccinate is dioctyl sulfosuccinic acid.

13. In a method of etching an object of a magnesium-base alloy, said object having portions of its surface masked with an acid resisting coating, the step which consists in impinging upon the surface of the object so as to contact both the masked and unmasked portions thereof, an etching bath comprising 2 to 14 per cent of $HNO_3$, a dioctyl sulfosuccinate in a percentage concentration of at least 0.005 of that of the per cent of the $HNO_3$ in the bath but not in excess of 0.10 of the percentage of the $HNO_3$, from 2 to 15 per cent of diethyl benzene, and a water-dispersible thickening agent selected from the group consisting of the water-soluble gums, gelatin, dextrin, and methyl cellulose in a percentage by weight of the bath amounting to A times the ratio of the per cent of the dioctyl sulfosuccinate to the per cent of the $HNO_3$ in the bath, A having the following values: between 0.1 and 1 for the water-soluble gums, between 0.002 and 0.015 for gelatin, between 0.0007 and 0.01 for methyl cellulose, and between 3 and 7 for dextrin.

14. In a method according to claim 13 in which the thickening agent is gum arabic in a percentage by weight of the bath between 0.1 and 1 of the ratio of the per cent of the dioctyl sulfosuccinate to the per cent of the $HNO_3$ in the bath.

15. In a method according to claim 13 in which the thickening agent is gelatin in a percentage by weight of the bath between 0.0020 and 0.015 of the ratio of the per cent of the dioctyl sulfosuccinate to the per cent of $HNO_3$ in the bath.

16. In a method according to claim 13 in which the dioctyl sulfosuccinate is sodium dioctyl sulfosuccinate, and the thickening agent is gelatin in a percentage by weight of the bath between about 0.0020 and 0.15 of the ratio of the per cent of the sodium dioctyl sulfosuccinate to the per cent of the $HNO_3$ in the bath.

17. In a method according to claim 13 in which the dioctyl sulfosuccinate is sodium dioctyl sulfosuccinate, and the thickening agent is gum arabic in a percentage by weight of the bath between about 0.01 to 1 of the ratio of the per cent of the sodium dioctyl sulfosuccinate to the per cent of the $HNO_3$ in the bath.

18. In a method in according to claim 13 in which the dioctyl sulfosuccinate is sodium dioctyl sulfosuccinate, and the thickening agent is methyl cellulose in a percentage by weight of the bath between about 0.0007 to 0.01 of the ratio of the per cent of the sodium dioctyl sulfosuccinate to the per cent of the $HNO_3$ in the bath.

References Cited in the file of this patent

UNITED STATES PATENTS

| | | |
|---|---|---|
| 1,022,274 | Strecker | Apr. 2, 1912 |
| 1,534,446 | Gravell | Apr. 21, 1925 |
| 1,660,366 | Tutzschke | Feb. 28, 1928 |
| 1,994,500 | Boller | Mar. 19, 1935 |
| 2,203,849 | Trist | June 11, 1940 |
| 2,593,449 | Hesch | Apr. 22, 1952 |
| 2,614,913 | Reindi et al. | Oct. 21, 1952 |
| 2,640,765 | Easley et al. | June 2, 1953 |
| 2,647,864 | Goffredo | Aug. 4, 1953 |